United States Patent
Lee et al.

(10) Patent No.: US 9,634,785 B2
(45) Date of Patent: Apr. 25, 2017

(54) INTERFERENCE CANCELLATION METHOD OF USER EQUIPMENT IN CELLULAR COMMUNICATION SYSTEM

(71) Applicant: Samsung Electronics Co., Ltd., Gyeonggi-do (KR)

(72) Inventors: Heun-Chul Lee, Gyeonggi-do (KR); Jong-Han Lim, Seoul (KR)

(73) Assignee: Samsung Electronics Co., Ltd (KR)

( * ) Notice: Subject to any disclaimer, the term of this patent is extended or adjusted under 35 U.S.C. 154(b) by 88 days.

(21) Appl. No.: 14/793,332

(22) Filed: Jul. 7, 2015

(65) Prior Publication Data

US 2016/0036547 A1    Feb. 4, 2016

Related U.S. Application Data

(60) Provisional application No. 62/031,436, filed on Jul. 31, 2014.

(30) Foreign Application Priority Data

Feb. 11, 2015    (KR) .................. 10-2015-0021214
Apr. 29, 2015    (KR) .................. 10-2015-0060756

(51) Int. Cl.
*H04W 4/00*    (2009.01)
*H04J 11/00*    (2006.01)
(Continued)

(52) U.S. Cl.
CPC .......... *H04J 11/005* (2013.01); *H04B 7/0486* (2013.01); *H04W 72/082* (2013.01); *H04B 7/0413* (2013.01)

(58) Field of Classification Search
None
See application file for complete search history.

(56) References Cited

U.S. PATENT DOCUMENTS

2009/0147890 A1*    6/2009    Lee ............... H04B 7/0851
                                                    375/341
2013/0058427 A1    3/2013    Bai et al.
(Continued)

FOREIGN PATENT DOCUMENTS

EP    2 966 885    2/2014
GB    2 520 944    6/2015

OTHER PUBLICATIONS

Krishna Gomadam et al., "A Distributed Numerical Approach to Interference Alignment and Applications to Wireless Interference Networks", IEEE Transactions on Information Theory, vol. 57, No. 6, Jun. 1, 2011, 14 pages.
(Continued)

*Primary Examiner* — Otis L Thompson, Jr.
(74) *Attorney, Agent, or Firm* — The Farrell Law Firm, P.C.

(57) ABSTRACT

An interference cancellation method and apparatus of user equipment in a cellular communication system is provided. The method includes receiving signals including a desired signal and an interference signal from one or more base stations; determining a maximum likelihood (ML) decision metric to determine a value "l" of a rank indicator (RI), a value "p" of a precoding matrix indicator (PMI), and a value "q" of a modulation (MOD) level of the interference signal; applying a logarithm to the ML decision metric, and applying a maximum-log approximation to a serving data vector and an interference data vector, which are included in the ML decision metric; determining the values of "l," "p," and "q" using the applied ML decision metric; and cancelling the interference signal from the received signals using the determined values of "l," "p," and "q."

20 Claims, 3 Drawing Sheets

(51) Int. Cl.
*H04B 7/04* (2017.01)
*H04W 72/08* (2009.01)
*H04B 7/0413* (2017.01)

(56) References Cited

U.S. PATENT DOCUMENTS

| | | | |
|---|---|---|---|
| 2014/0086296 A1* | 3/2014 | Badic | H04L 25/03891 375/229 |
| 2014/0098773 A1 | 4/2014 | Yoo et al. | |
| 2014/0133537 A1 | 5/2014 | Bai et al. | |
| 2014/0204857 A1* | 7/2014 | Mallik | H04L 1/0009 370/329 |
| 2015/0147994 A1* | 5/2015 | Tsai | H04B 1/1027 455/296 |
| 2015/0229373 A1* | 8/2015 | Lee | H04B 1/10 375/347 |
| 2016/0065258 A1* | 3/2016 | Lee | H04W 76/046 375/346 |
| 2016/0219599 A1* | 7/2016 | Lee | H04B 7/0486 |
| 2016/0227559 A1* | 8/2016 | Schober | H04W 72/1231 |

OTHER PUBLICATIONS

German Office Action dated Apr. 8, 2016 issued in counterpart application No. 102015214329.5, 10 pages.

* cited by examiner

INTERFERENCE CANCELLATION METHOD OF USER EQUIPMENT IN CELLULAR COMMUNICATION SYSTEM

PRIORITY

This application claims priority under 35 U.S.C. §119(e) to a U.S. Provisional Patent Application filed on Jul. 31, 2014 in the U.S. Patent and Trademark Office and assigned Ser. No. 62/031,436, and claims priority under 35 U.S.C. §119(a) to a Korean Patent Application filed on Feb. 11, 2015 in the Korean Intellectual Property Office and assigned Serial No. 10-2015-0021214, and a Korean Patent Application filed on Apr. 29, 2015 in the Korean Intellectual Property Office and assigned Serial No. 10-2015-0060756, the entire content of each of which are incorporated herein by reference.

BACKGROUND

1. Field of the Disclosure

The present disclosure relates generally to an interference cancellation method of user equipment in a cellular communication system, and more particularly to an interference cancellation method on a basis of interference parameters that are blind-detected in a network-assisted interference cancellation and suppression (NAICS) system.

2. Description of the Related Art

In order to satisfy strict requirements of International Telecommunication Union Radio (ITU-R) Communication Sector next generation cellular networks, such as long term evolution advanced (LTE-A), which support a wide bandwidth up to 100 MHz through higher-order spatial multiplexing to eight layers and four layers in a downlink (DL) and an uplink (UL), respectively, and carrier aggregation (CA), have been designed.

It is noteworthy that spatial frequency reuse for using more cells may provide more capacity benefits than a single cell that with an increased spatial dimension or spectrum bandwidth. Therefore, heterogeneous networks, which use small cells in a macro cell environment, are increasingly being viewed as a promising path for the next generation cellular networks.

The heterogeneous networks above may provide various benefits, but the heterogeneous networks may cause the cellular network to face unprecedented challenges. Particularly, interference management, which is a major concern as the number of base stations (BS) increases, may increase considerably. In this context, advanced co-channel interference aware signal detection has drawn the attention of researchers in the course of the recent development of LTE-A systems.

Features of network-assisted interference cancellation and suppression (NAICS) are being researched by the 3rd Generation Partnership Project (3GPP). User equipment (UE) may perform interference cancellation on the assumption that interference parameters including a rank indicator (RI), a preceding matrix indicator (PMI), and a modulation (MOD) level have been known to the UE through network signaling.

Inclusion of a work item referred to as the NAICS in LTE Release 12 is currently under consideration. A study has obviously showed that a considerable performance benefit can be attained on the assumption that the interference parameters have been known to the UE by broadcasting {e.g., upper layer signaling such as radio resource control (RRC)}, or dedicated signaling {e.g., newly defined downlink control information (DCI)}.

However, since the back-haul capacity between the BSs, and the control channel capacity from the BS to the UE are generally limited, the assumption is not always applied to actual systems. In fact, interference cancellation technology between similar cells, which is known as further enhanced inter-cell interference coordination (FeICIC), has been well developed, focusing on pilot signals, i.e., cell-specific reference signals (CRS). Since the CRS interference cancellation (IC) requires only semi-static interference parameters, such as a physical cell identity (CID), CRS antenna ports (AP), and a multicast broadcast single frequency network (MBSFN) subframe configuration, it is noteworthy that signaling overhead enabling the FeICIC can be managed.

However, unlike the FeICIC, the NAICS addresses interference in a data channel, which is known as a physical downlink shared channel (PDSCH), and requires the knowledge about dynamic interference parameters including an RI, a PMI, and an MOD. The success of the NAICS on the basis of signaling depends on the interference BSs that use a group of the RI, the PMI, and the MOD, which are signaled, and this may potentially limit the scheduling flexibility of nearby cells.

In order to overcome the defects, such as the scheduling limitation and the network signaling overhead, the UE may blind-estimate the interference parameters from received signals. The maximum likelihood (ML) estimation, which includes exhaustive search among the available combinations of the RIs, the PMIs, and the MODs designated in the LTE system, is applied to joint blind detection (BD) of the RI, the PMI, and the MOD. The allocated RI, PMI, and MOD may be changed from one transmission time interval (TTI) to another TTI in the time area, and from one resource block (RB) to another RB in the frequency area over the UE devices, which are simultaneously scheduled, in LTE-or-thogonal frequency division multiple access (LTE-OFDMA) systems. This indicates that the joint blind detection should be conducted with respect to each RB of all TTIs in the LTE DL systems.

However, since the interference parameters may be dynamically changed from one RB to another RB in the frequency area in every TTI, according to the channel condition, this assumption may limit the performance of scheduling and may cause an excessive increase in the network signaling load.

SUMMARY

An aspect of the present disclosure provides interference cancellation on the basis of NAICS interference parameters that are blind-detected.

Another aspect of the present disclosure provides a blind detection algorithm with low complexity in order to estimate interference RI, PMI, and MOD.

Another aspect of the present disclosure provides a method for compensating for degradation of performance resulting from blind detection of low complexity.

In accordance with an aspect of the present disclosure, an interference cancellation method of user equipment (UE) in a cellular communication system is provided. The method includes receiving signals including a desired signal and an interference signal from one or more base stations; determining a maximum likelihood (ML) decision metric to determine a value "l" of a rank indicator (RI), a value "p" of a precoding matrix indicator (PMI), and a value "q" of a modulation (MOD) level of the interference signal; applying a logarithm to the ML decision metric, and applying a maximum-log approximation to a serving data vector and an interference data vector, which are included in the ML decision metric; determining the values of "l," "p," and "q" using the applied ML decision metric; and cancelling the interference signal from the received signals using the determined values of "l," "p," and "q."

In accordance with another aspect of the present disclosure, an apparatus for interference cancellation in a cellular communication system is provided. The apparatus includes a controller configured to: receive signals including a desired signal and an interference signal from one or more base stations; determine a maximum likelihood (ML) decision metric to determine a value "l" of a rank indicator (RI), a value "p" of a precoding matrix indicator (PMI), and a value "q" of a modulation (MOD) level of the interference signal; apply a logarithm to the ML decision metric, and apply the maximum-log approximation to a serving data vector and an interference data vector, which are included in the ML decision metric; determine the values of "l," "p," and "q" using the applied ML decision metric; and cancel the interference signal from the received signals using the determined values of "l," "p," and "q."

The ML determination of interference RI, PMI, and MOD, according to the present disclosure, can attain a tremendous decrease in the complexity, and can implement user equipment using a transmission signal vector having a certain RI, PMI, and MOD, which minimizes a Euclidean metric.

In addition, the present disclosure can give the effect of approximating an optimal RI, PMI, and MOD detection method by applying a bias term for compensating for degradation of performance to an ML decision metric.

According to the present disclosure, future UE devices with high performance and low complexity can be implemented using an improved NAICS receiver based on blind detection.

BRIEF DESCRIPTION OF THE DRAWINGS

The above and other aspects, features, and advantages of the present disclosure will be more apparent from the following detailed description, taken in conjunction with the accompanying drawings, in which.

DETAILED DESCRIPTION OF EMBODIMENTS OF THE PRESENT DISCLOSURE

Hereinafter, embodiments of the present disclosure are described in detail with reference to the accompanying drawings. In the following description of the present disclosure, a detailed description of known configurations or functions incorporated herein are omitted when it is determined that the detailed description may make the subject matter of the present disclosure unclear. The terms as described below are defined in consideration of the functions in the embodiments of the present disclosure, and the meanings of the terms may vary according to the intention of a user or operator, convention, or the like. Accordingly, the definitions of the terms should be determined on the basis of the overall context of the embodiments of the present disclosure.

In the detailed description of the present disclosure, an example of interpretable meanings of some terms used in the present disclosure is provided. However, it is noted that the terms are not limited to the examples of the construable meanings which are provided below.

A base station is a main body communicating with a user equipment (UE), and may be referred to as a BS, a Node B (NB), an eNode B (eNB), an access point (AP), and the like.

The user equipment is a subject communicating with a BS, and may be referred to as a UE, a mobile station (MS), a mobile equipment (ME), a device, a terminal, and the like.

The description Is provided of a system model, a baseline LTE receiver, and an improved NAICS LTE-A receiver. Then an optimal ML algorithm for estimating the interference RI, PMI, and MOD, and the second-best approximating method with a compensation bias will follow the same.

First, a system model and an improved LTE receiver are described.

In the present disclosure, in order to compare performance with a baseline LTE receiver, a legacy linear multiple-input multiple-output (MIMO) receiver is generally described.

Figure 1:
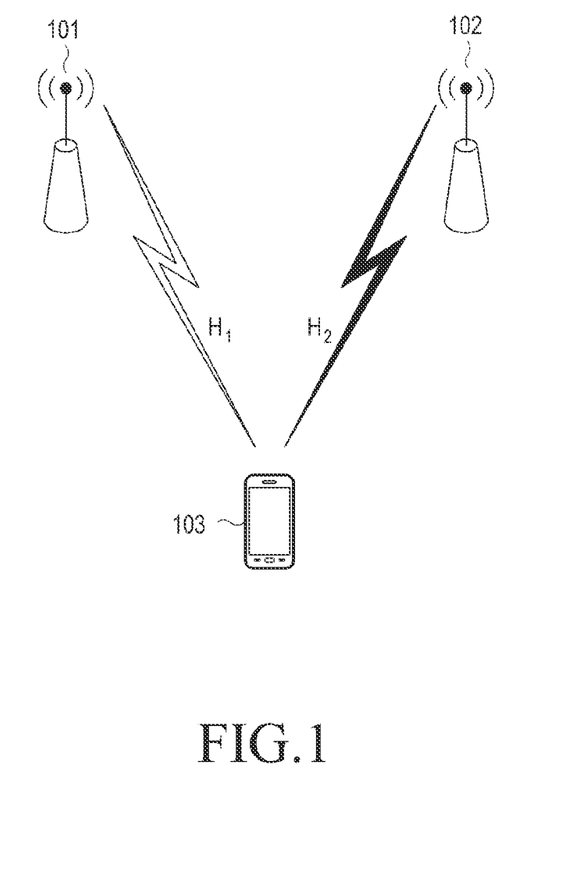
FIG. 1 illustrates a MIMO-OFDM system comprised of two base stations and a UE device.

FIG. 1 illustrates a MIMO-OFDM system including two base stations and a UE device.

Referring to FIG. 1, a downlink MIMO-OFDM system is shown in which two BSs 101 and 102, which have Nt transmission antennas, respectively, transmit messages to the desired UE 103, which has Nr reception antennas. The transmission channel in the present disclosure, for example, may be a physical downlink shared channel (PDSCH), or a physical multicast channel (PMCH).

In the case of a normal cyclic prefix (CP) in the research of the NAICS, it is assumed that a single group of the RI, the PMI, and the MOD is allocated to a pair of RBs comprised of twelve consecutive subcarriers in the period of a single TTI corresponding to fourteen OFDM symbol intervals. Accordingly, the blind detection and the data detection may be performed in a pair of RBs comprised of 168 resource elements (RE). In this case, it is assumed that the UE knows the NAICS interference parameters, i.e., the RI, the PMI, and the MOD.

In this case, an $l_i$-dimensional complex signal vector, which is transmitted from the BSi in the kth RE, may be expressed as $$x_k^i = [x_k^{i,1}, \ldots, x_k^{i,l_i}].$$

In this case, $X_k^{i,l}$ denotes the lth spatial layer, $L_i$ denotes a transmission layer, i.e., the number of RIs. $(\ )^T$-denotes vector prefix. The symbol of $X_k^{i,l}$ is selected from a constellation group $C^{i,l}$ which the cardinality is expressed as $|C^{i,l}|$ the average transmission power of $X_k^{i,l}$ is given as $$E[|x_k^{i,l}|^2] = \sigma_i^2,$$

where E[ ] denotes an expectation operator, and | | denotes an absolute value of a complex number. Generally, it is assumed that "BSi =S" is a serving BS, and "BSi =I" is an interference BS.

In this case, "$r_k$" is defined as a signal vector that is received by the desired UE 103 in the "REk." Then, "$r_k$" may be expressed as Equation (1) as follows.

$$r_k = H_k^S x_k^S + H_k^I x_k^I + n_k, \text{ for } k=1, 2, \ldots, K. \quad (1)$$

where $H_k^i$ refers to an effective channel matrix including an actual channel matrix and a precoding matrix, and the element "$n_k$" refers to an additive noise vector as an independently and identically distributed (i.i.d.) complex Gaussian of distribution $\sigma_n^2$. In addition, "K" denotes the number of coded REs, which are used in each pair of RBs.

The IRC receiver is described below as the baseline LTE receiver.

With regard to the base line LTE receiver, the present disclosure considers a linear receiver that is referred to as an interference rejection combiner (IRC). The IRC may suppress inter-cell interference as well as inter-stream interference in the spatial multiplexing transmission. The weight matrix of the IRC may be expressed as Equation (2) as follows.

$$W_k = (H_k^S)^\dagger R_k^{-1}. \quad (2)$$

where ( )$^\dagger$ refers to a Hermitian operator, and the covariance matrix "$R_k$," which includes desired/undesired signals and noise vectors, may be expressed as Equation (3) as follows.

$$R_k = \sigma_S^2 H_k^S (H_k^S)^\dagger + R^{I+N} \quad (3)$$

Since the CRS sequence of the serving cell is known to the UE, the interference-plus-noise (I+N) covariance matrix $R^{I+N}$ may be estimated by averaging factors of the interference and noise vectors in serving cell specific reference signal-resource elements (CRS-RE) in the pair of RBs. Thus, $R^{I+N}$ may be given as Equation (4) as follows.

$$R_k^{I+N} = \frac{1}{K_{crs}} \sum_{k=1}^{K_{crs}} (r_k - H_k^S S_k^S) \quad (4)$$

where $K_{crs}$ is the number of serving CRS-REs in each pair of RBs, and $S_k^S$ is a transmission vector corresponding to the CRS sequence of the serving cell.

The improved NAICS receiver on the basis of the enhanced IRC and ML is described below.

Unlike the baseline LTE receivers, the improved NAICS receivers may utilize information on the interference for improving the performance of the MIMO, i.e., the interference channel matrix and the interference parameters. Therefore, the present disclosure generalizes the model of Equation (1) as the terms of well-known interference information, and describe two improved NAICS receivers based on the enhanced IRC and ML demodulation.

In this case, the channel model from the "BSi" in the "REk" to the desired UE is defined as the $N_r$-by-$N_r$ channel matrix $G_k^i$. The (m, n) entry of $G_k^i$ refers to a path gain from the antenna "n" of the "BSi" to the antenna "m" of the UE. Modeling of the entries may be made as independent complex Gaussian random variables that have a zero average and unit distribution, i.e., Rayleigh fading. $P_k^i$ is an $N_r$-by-$1_i$ precoding matrix (or vector) that is used by the "BSi" in the "REk."

The UE may calculate the effective channel $H_k^i$ by multiplying the 20 precoding matrix $P_k^i$ and the channel matrix $G_k^i$. Thus, Equation (1) may be re-written as Equation (5) using $H_k^i = G_k^S P_k^i$, as follows.

$$r_k = H_k^S x_k^S + G_k^I P_k^I x_k^I + n_k \quad (5)$$

The enhanced IRC defined in the NAICS research may use the knowledge about the interference RI and PMI in order to obtain $P_k^I$, and a corresponding weight matrix may be expressed as Equation (6) as follows.

$$W_k = (H_k^S)^\dagger (\sigma_S^2 H_k^S (H_k^S)^\dagger + \sigma_I^2 G_k^I P_k^I (G_k^I P_k^I)^\dagger + \sigma_n^2 I)^{-1} \quad (6)$$

Compared with the NAICS IRC, the NAICS ML may realize the advantage of characteristics of the NAICS using the knowledge of the MOD as well as the interference RI and PMI. According to the definition of the NAICS, only soft bit information on the serving data $x_k^S = [x_k^{S,1}, \ldots, x_k^{S,l_S}]^T$ is required. In this case, the $m^{th}$ (m=1, 2, ..., $\log_2 |\mathbb{C}^{S,l}|$) bit of the constellation symbol $x_k^{S,l}$ is expressed as $b_{k,l,m}^S$. In addition, a log likelihood ratio (LLR) $L(b_{k,j,m}^S)$ for the bit $b_{k,l,m}^S$ may be expressed as Equation (7) as follows.

$$L(b_{k,l,m}^S) = \log \frac{P(b_{k,l,m}^S = 1)}{P(b_{k,l,m}^S = 0)} \quad (7)$$

where $P(b_{k,l,m}^S = b)$ refers to the probability in which the random variable $b_{k,l,m}^S$ uses the value "b" (b=0, or 1).

The conditional probability density function (pdf) $p(r_k | x_k^S, x_k^I)$ of "$r_k$" based on $x_k^s$ and $x_k^I$ may be expressed as Equation (8), and an LLR value of $b_{k,l,m}^S$ may be given as Equation (9) as follows.

$$p(r_k | x_k^S, x_k^I) = \frac{1}{(\pi \sigma_n^2)^{N_r}} \exp\left(-\frac{\|r_k - H_k^S x_k^S - G_k^I P_k^I x_k^I\|^2}{\sigma_n^2}\right) \quad (8)$$

$$L(b_{k,l,m}^S) = \log \frac{\sum_{x_k^S \in \chi_{\{1,l,m\}}^S} \sum_{x_k^I \in \chi^I} p(r_k | x_k^S, x_k^I)}{\sum_{x_k^S \in \chi_{\{0,l,m\}}^S} \sum_{x_k^I \in \chi^I} p(r_k | x_k^S, x_k^I)} \quad (9)$$

where $x^i$ refers to a group of available symbol vectors $x_k^i$, which are obtained by the $1_i$-fold Cartesian product of $C^{i,l}$, and $x_{\{b,l,m\}}^S$ refers to a partial group of $x^s$, wherein $b_{\{k,l,m\}}^S = b$ (b=0, or 1) In addition, the $\|\ \|$ operator denotes the Euclidean norm.

$$\frac{1}{(\pi\sigma_n^2)^{N_r}}$$

is a constant in Equation (8) above, so it will be disregarded hereinafter.

The NAICS ML receiver has the highest complexity among the LTE receivers set forth above. The compromise between the performance and the complexity may be made by applying the maximum-log approximation to Equation (9) above. The approximation may allow the LLR calculation on the basis of the minimum Euclidean distance according to Equation (10) as follows.

$$L(b_{k,l,m}^S) = \min_{x_k^S \in \chi_{\{0,l,m\}}^S, x_k^I \in \chi^I} \frac{\|r_k - H_k^S x_k^S - G_k^I P_k^I x_k^I\|^2}{\sigma_n^2} - \min_{x_k^S \in \chi_{\{1,l,m\}}^S, x_k^I \in \chi^I} \frac{\|r_k - H_k^S x_k^S - G_k^I P_k^I x_k^I\|^2}{\sigma_n^2}. \quad (10)$$

Next, the detection of the interference RI, PMI, and MOD is described below.

The description above shows that the basic principle of the NAICS relies on the use of interference information, i.e., the RI, the PMI, and the MOD, in the UE. The NAICS interference parameters can be obtained while allowing the scheduling limitation and/or the network signaling overhead in the interference BSs. In order to overcome the disadvantages above, the present disclosure provides blind detection of the parameters in the UE.

In the LTE systems, it should be noted that the RI, the PMI, and the MOD for the serving data can be implicitly found by reading downlink control information (DCI) in the physical downlink control channel (PDCCH) from the serving BS. However, there is no information on the interference RI, PMI, and MOD, which can be used in the UE.

When a modulation level "q," q∈ {4,16,64}, is given with respect to unknown interference modulation $C^{i,I}$, the prior probability of each modulation level "q," and the prior probability of each constellation point $C_q^j$, j ∈ {1,..., q}, may be expressed as $P_q$ and $P_q^j$, respectively.

Table 1 below shows candidate groups of the RIs, the PMIs, and the MODs for fundamental transmission modes (TM) assigned to the MIMO LTE systems that have two antennas, i.e., Nt=2. In this case, the RI, the PMI, and the MOD are labeled "l," "p," and "q," respectively.

TABLE 1

TRANSMISSION MODES (TMs) AND CANDIDATE RI/PMI/MODs

| TM | RI(l) | PMI ( p) | MOD (q) |
|---|---|---|---|
| 2 | 2 | $\frac{1}{\sqrt{2}}\begin{bmatrix} 1 & 0 \\ 0 & 1 \end{bmatrix}$ | {4, 4}, {16, 16} |
| 3 | 2 | $\frac{1}{2}\begin{bmatrix} 1 & 1 \\ 1 & -1 \end{bmatrix}, \frac{1}{2}\begin{bmatrix} 1 & 1 \\ -1 & 1 \end{bmatrix}$ | {4, 4}, {16, 16} |
| 4 | 2 | $\frac{1}{2}\begin{bmatrix} 1 & 1 \\ 1 & -1 \end{bmatrix}, \frac{1}{2}\begin{bmatrix} 1 & 1 \\ -j & j \end{bmatrix}$ | {4, 4}, {4, 16} {16, 4}, {16, 16} |
| 4/6 | 1 | $\frac{1}{\sqrt{2}}\begin{bmatrix} 1 \\ \exp(j\frac{k\pi}{2}) \end{bmatrix}$, k = 0, 1, 2, 3 | 4, 16 |

As shown in Table 1 above, two precoding matrixes, which are assigned to TM 3, do not make a difference in the performance of the blind detection and the MIMO demodulation, so TM 3 may be regarded as a subgroup of TM 4. Likewise, TM 4 corresponding to l=1 may be regarded as TM 6. Therefore, in a subsequent MIMO demodulation operation, the interference TMs may be detected as one of TM 2 wherein l=2, TM 4 wherein l=2, or TM 6 wherein l=1.

The modulation used in the LTE downlink may include 4-quadrature amplitude modulation (4QAM), 16QAM, 64QAM, and 256QAM.

Figure 2:
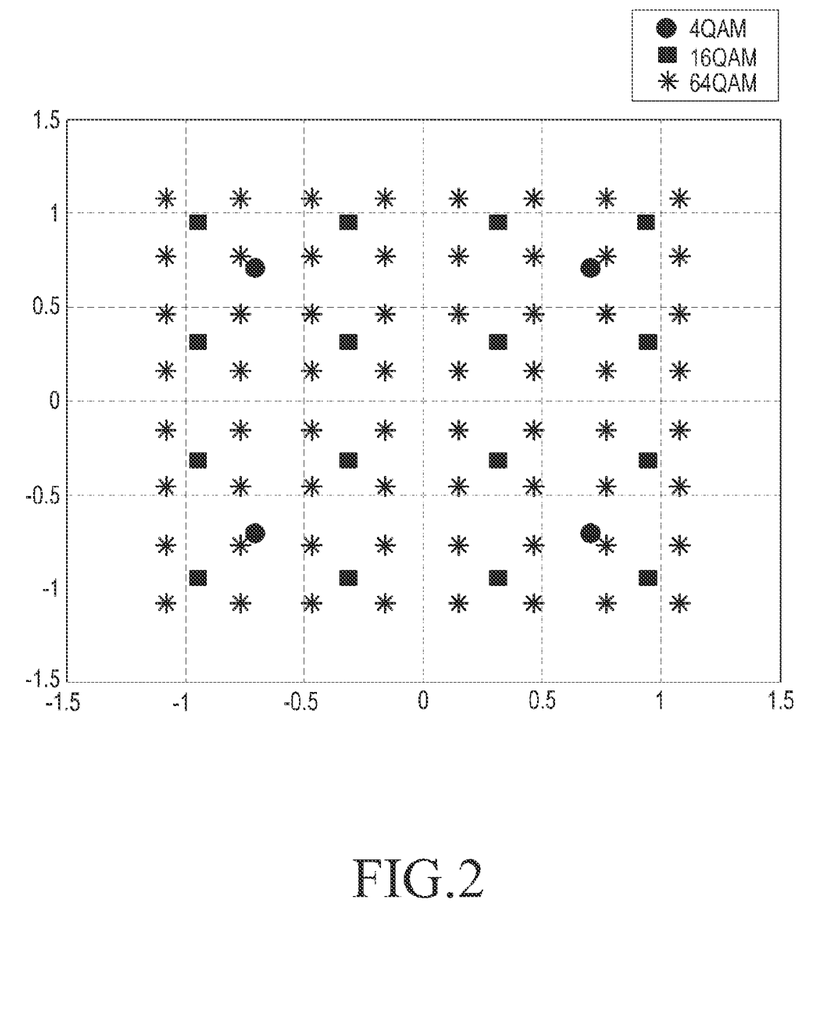
FIG. 2 illustrates constellation diagrams of 4QAM, 16QAM, and 64QAM, which are used in an LTE downlink.

FIG. 2 illustrates constellation diagrams of 4QAM, 16QAM, and 64QAM, which are used in the LTE downlink.

FIG. 2 shows three constellation diagrams about 4QAM, 16QAM, and 64QAM, which are expressed as $Q_4$, $Q_{16}$, and $Q_{64}$ (corresponding to ●, ■, and +, respectively) in the LTE downlink transmission. The constellation points of each LTE constellation diagram are normalized to have a unit variance.

An optimal joint detection method of the RI, the PMI, and the MOD are described below.

The NAICS ML receiver may perform symbol level interference cancellation without preliminary information on the interference RI, PMI, and MOD. Therefore, it can be assumed that groups of the RIs, the PMIs, and the MODs in Table 1 above are equally possible. In addition, the same assumption may be applied to the constellation points as well. That is, it is assumed that $p_q = 1/3$, and $p_q^j = 1/q$. In this case, it is well known that the blind detection based on the ML estimation can minimize the error probability.

The conditional pdf in Equation (8) above may be rewritten as Equation (11) by expressing the precoding matrix corresponding to a specific $P_k^j$, which has "l" and "p," as $p_k^{l,l,p}$ as follows.

$$p(r_k | x_k^S, x_k^I, P_k^{I,l,p}) = \exp\left(-\frac{\|r_k - H_k^S x_k^S - G_k^I P_k^{I,l,p} x_k^I\|^2}{\sigma_n^2}\right) \quad (11)$$

Accordingly, the ML metric of "l," "p," and "q" on the basis of K reception signal vectors $r_k$ may be given as Equation (12) as follows.

$$M_{l,p,q} = \prod_{k=1}^{K} \frac{1}{|X^S|} \sum_{x_k^S \in X^S} \frac{1}{|X_{l,q}^I|} \sum_{x_k^I \in X_{l,q}^I} p(r_k | x_k^S, x_k^I, P_k^{I,l,p}) \quad (12)$$

where $x_{l,q}^I$ corresponds to $x^i$ that has the RI "l" and the MOD "q," which are obtained through the 1-fold Cartesian product of $Q_q$.

At this time, the ML receiver (or an ML detector) may perform the exhaustive search among available groups of "l," "p," and "q," and may determine $l^{opt}$, $p^{opt}$, and $q^{opt}$, which maximize a metric defined by Equation (13) as follows.

$$(l^{opt}, p^{opt}, q^{opt}) = \arg_{l \in S^l, p \in S^p, q \in \{4, 16, 64\}}^{max} M_{l,p,q} \quad (13)$$

where $S^l$ and SP refer to a group of available values with respect to "l" and "p," respectively, and where they are a function of {Nt, TM} and {Nt, TM, l}, respectively, as shown in Table 1 above.

As shown in Equation (12) and Equation (13) above, in which the optimal ML detector is to calculate a decision metric for all of the available combinations of the interference RI, PMI, and MOD together with the serving data constellation points, the optimal joint detection of the RI, the PMI, and the MOD leads to a calculation that is too complicated to process in the UE.

Accordingly, the present disclosure provides the second-best approach with decreased computation complexity in order to deal with the optimal metric of Equation (12) above. In order to avoid multiplying exponential sums through all search spaces, the present disclosure provides a method by which the ML decision metric is applied with a logarithm, and then the maximum-log approximation is applied to the serving data vector, to thereby cope with the problem of the ML detection set forth above.

That is, in order to avoid multiplying exponential sums in Equation (12) above, the optimal metric of Equation (12) is operated using a logarithm, and then the maximum-log approximation is applied to the serving data vector $x_k^s$. Thus, the decision metric q may be approximated as Equation (14) as follows.

$$M_{l,p,q} \approx \sum_{k=1}^{K} \ln\left(\frac{1}{|\chi_{l,q}^I|} \sum_{x_k^I \in \chi_{l,q}^I} p(r_k \mid \hat{x}_k^S, x_k^I, P_k^{l,L,p})\right) - K\ln(|\chi^S|), \quad (14)$$

where $\hat{x}_k^S$ may be obtained by finding transmission vectors $\hat{x}_k^S$ and $\hat{x}_k^I$, which minimize the Euclidean metric in Equation (15) as follows.

$$(\hat{x}_k^S, \hat{x}_k^I) = \arg\min_{x_k^S \in \chi^S, x_k^I \in \chi_{l,q}^I} \|r_k - H_k^S x_k^S - G_k^I P_k^{l,L,p} x_k^I\|^2 \quad (15)$$

After removing the constant term, Equation (14) above may be rewritten as Equation (16) as follows.

$$M_{l,p,q} \approx \quad (16)$$

$$\sum_{k=1}^{K} \left(-\frac{1}{\sigma_n^2}\|r_k - H_k^S \hat{x}_k^S - G_k^I P_k^{l,L,p} \hat{x}_k^I\|^2 + R(l, p, q, \sigma_n)\right) - K\ln(|\chi_{l,q}^I|).$$

where the residual term $R(l, p, q, \sigma_n)$ may be expressed as Equation (17) as follows.

$$R(l, p, q, \sigma_n) = \ln\left(1 + \frac{\sum_{x_k^I \neq \hat{x}_k^I \in \chi_{l,q}^I} p(r_k \mid \hat{x}_k^S, x_k^I, P_k^{l,L,p})}{p(r_k \mid \hat{x}_k^S, \hat{x}_k^I, P_k^{l,L,p})}\right) \quad (17)$$

When the maximum-log approximation is applied to the interference data vector $x_k^I$ in the same manner as the maximum-log approximation with respect to the serving data vector $x_k^S$, the simplest ML decision metric may be obtained as Equation (18) as follows.

$$M_{l,p,q} \approx \sum_{k=1}^{K} \left(-\frac{1}{\sigma_n^2}\|r_k - H_k^S \hat{x}_k^S - G_k^I P_k^{l,L,p} \hat{x}_k^I\|^2\right) - K\ln(|\chi_{l,q}^I|) \quad (18)$$

The present disclosure provides a method for calculating an approximation of the resulting ML metric with respect to the minimum distance problem, and compensating degradation of performance in relation to the second-best approximation.

More specifically, compared with the maximum-log approximation of the serving data vector $x_k^S$, which affects detection of all candidate groups of the RI, the PMI, and the MOD, the application of the maximum-log approximation to obtain Equation (18) above may cause a relatively big difference in the Euclidean metrics between different candidate groups. The difference indicates a probable degradation of performance in the blind detection of the RI, the PMI, and the MOD. Therefore, the probable degradation of performance provides a motive to consider the residual term $R(l, p, q, \sigma_n)$ in the blind detection.

Accordingly, the present disclosure provides a method for using the residual term to compensate for the relative difference in the Euclidean metrics due to the application of the maximum-log approximation. That is, the present disclosure provides a method in which the decision metric includes the residual term $R(l, p, q, \sigma_n)$ by estimating a relative difference between a single reference group and other remaining groups of the RIs, the PMIs, and the MODs. For example, on the basis of l=2, p=1, and q=4 in TM 2, a bias term (e.g. the difference term) for the relative difference may be defined as Equation (19) as follows.

$$\Delta(l, p, q, \sigma_n) = E[R(l, p, q, \sigma_n) - R(l=2, p=1, q=4, \sigma_n)] \quad (19)$$

The suggested bias term may compensate for the relative difference between different groups of the RIs, the PMIs, and the MODs in order to ensure even ML detection performance. Consequently, only the relative bias terms may be stored in a look-up table (LUT), and the relative bias terms stored in the LUT enables simplification of the blind detection. The LUT is a common LUT that is applied to all of the serving TMs to which a certain group of the RI, the PMI, and the MOD may be applied.

Table 2 below shows an example of an LUT, as an LUT for the relative compensation bias between different groups of the RI(l), PMI(p), and MOD(q), on the assumption that the interference UE devices use 4QAM and 16QAM. However, the LUT is not limited thereto, and it may be configured to include relative compensation biases for the 64QAM and the 256QAM.

TABLE 2

| | TM(l) | 2(2) | | 3(2) or 4(2) | | | 4(1) or 6(1) | |
|---|---|---|---|---|---|---|---|---|
| INR(dB) | q | 4 | 16 | {4, 4} | {16, 4}, {4, 16} | {16, 16} | 4 | 16 |
| −4 | Δ(l, p, q, p$_n$) | 0.00 | 2.26 | −0.46 | 0.68 | 0.30 | −1.42 | −0.54 |
| 0 | | 0.00 | 2.14 | −0.58 | 0.34 | 0.18 | −1.42 | −0.66 |
| 4 | | 0.00 | 2.04 | −0.68 | 0.08 | 0.80 | −1.44 | −0.76 |
| 8 | | 0.00 | 2.02 | −0.70 | −0.04 | 0.64 | −1.42 | −0.80 |
| 12 | | 0.00 | 1.90 | −0.80 | −0.18 | 0.48 | −1.48 | −0.86 |
| 16 | | 0.00 | 1.50 | −0.98 | −0.42 | 0.18 | −1.58 | −0.98 |
| 20 | | 0.00 | 1.10 | −0.98 | −0.42 | 0.20 | −1.58 | −0.98 |

In Table 2 above, 2(2), 3(2), 4(2), 4(1), and 6(1) in the first row correspond to the form of "TM(l)," i.e., values of "TM" and "l" of the interference data. For example, in the first row, 2(2) corresponds to "TM 2" and "l=2," and 3(2) corresponds to "TM 3" and "l=2." 4, 16, and {4, 4} in the second row refer to the value (q) of the MOD. For example, in the second row, 4 and 16 correspond to 4QAM and 16QAM, respectively, and {4, 4} corresponds to {4QAM, 4QAM}. The INR stands for an interference to noise ratio, and it, for example, may be shown as "dB."

Consequently, the ML decision metric may be given as Equation (20) by which the blind detectors based on the minimum Euclidean distance are allowed as follows.

$$M_{l,p,q} \approx \qquad (20)$$

$$\sum_{k=1}^{K} \left( -\frac{1}{\sigma_n^2} \left\| r_k - H_k^S \hat{x}_k^S - G_k^I P_k^{I,l,p} \hat{x}_k^I \right\|^2 \right) - K \ln(|\chi_{l,q}^I|) + K\Delta(l, p, q, \sigma_n)$$

For example, when the INR is 4 dB in the case of TM 2 and q=16, 2.02 may be applied as a value of the compensation bias $\Delta(l, p, q, \sigma_n)$ in Equation (20) above.

As described above, RI(l), PMI(p), and MOD(q), which maximize the metric of Equation (20) above, may be determined by applying the compensation bias $\Delta(l, p, q, \sigma_n)$ to the candidate groups of "l," "p," and "q" so that the performance can be expected to approximate the optimal ML receiver even in low complexity.

That is, the improved NAICS receivers on the basis of the interference parameters blind-detected according to the present disclosure can considerably enhance the performance of the LTE-A UE in the interference limited cellular environment.

Figure 3:
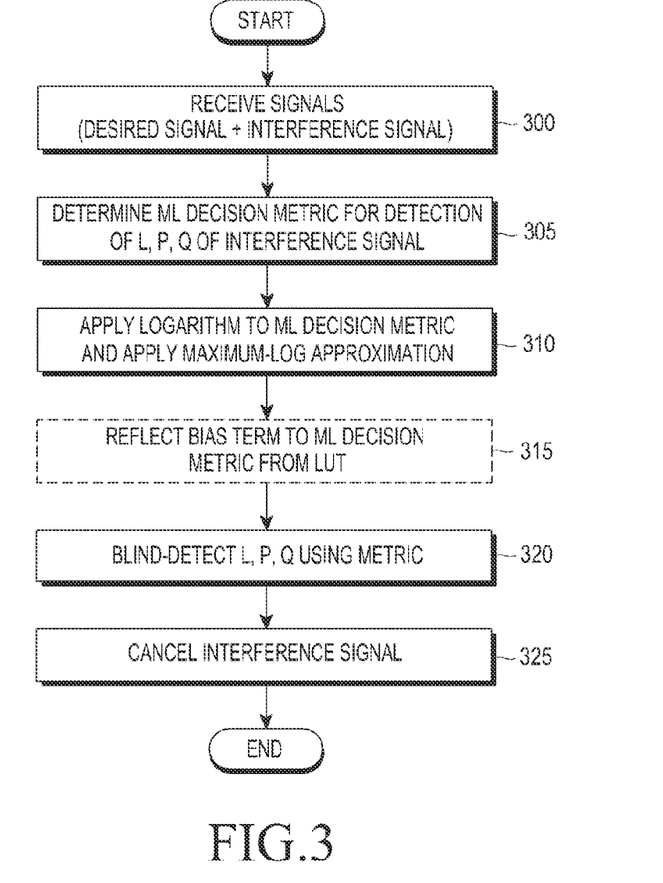
FIG. 3 is a flowchart of an interference cancellation method using blind detection by a UE according to the present disclosure.

FIG. 3 is a flowchart illustrating a method for cancelling interference signals using blind detection by a UE according to the present disclosure.

The UE may receive signals including a desired signal (e.g. serving data) and an interference signal (e.g. interference data) from the BS through the downlink channel using a transceiver {e.g., a radio frequency (RF) integrated circuit} in step 300. The downlink channel, for example, may be the PDSCH or the PMCH. The transceiver of the UE may operate according to the MIMO space multiplexing transmission method, and may transmit and receive signals using a plurality of antennas.

The UE may determine the ML decision metric to decide RI(l), PMI(p), and MOD(q) of the interference signal using a controller (e.g., a modem integrated circuit) in step 305. For example, the ML decision metric may be determined as Equation (12) above.

In order to lower the computation complexity of the blind detection, the UE may apply the logarithm to the ML decision metric, and may apply the maximum-log approximation to the serving data vector and the interference data vector, which are included in the ML decision metric in step 310.

Selectively, the UE may include the residual term R(l, p, q, $\sigma_n$) in the applied ML decision metric in order to enhance the performance of the blind detection. The residual term may be included in the ML decision metric as the bias term in step 315. The ML decision metric including the bias term, for example, may be expressed as Equation (20) above. The bias term aims at compensating for a difference between a reference group of "l," "p," and "q" and a certain candidate group of "l," "p," and "q." The value to be applied to the bias term may be stored in the LUT, and the UE may obtain the bias value by retrieving the same from the LUT. The LUT may record a bias value due to a difference between a reference group of "l," "p," and "q" and a candidate group of "l," "p," and "q" with respect to a given INR. Then, the value of "q" may be designated as 4QAM, 16QAM, 64QAM, or 256QAM.

The UE may detect "l," "p," and "q" using the metric in step 320. For example, the UE may blind-detect "l," "p," and "q," which maximize the metric. The value, which maximizes the metric, may be a value that minimizes the Euclidean metric expressed by Equation (15) above.

The UE may cancel the interference signal from the received signal using the detected "l," "p," and "q" in step 325.

Figure 4:
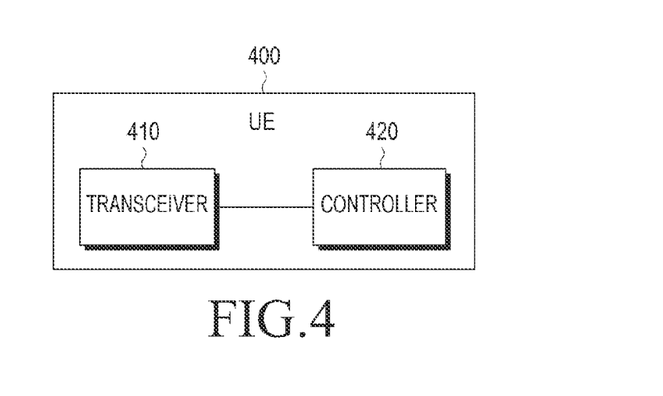
FIG. 4 is a block diagram of a UE device according to the present disclosure.

FIG. 4 is a block diagram of a user equipment device 400 according to the present disclosure.

The UE device 400 includes a transceiver 410 that communicates with the BS or other UE devices and a controller 420 that controls the transceiver 410. The transceiver 410 may be implemented by a device, such as an RF integrated circuit, and the controller 420 may be implemented by a device, such as a modem integrated circuit. Alternatively, the transceiver 410 and the controller 420 may be implemented as a single device (i.e., a single integrated circuit) as well.

The controller 420 performs the interference cancellation method of the UE set forth in the present disclosure. That is, all of the operations described above may be understood to be carried out by the controller 420. The controller 420 may include a memory for the LUT storage inside or outside the same.

The transceiver 410 may transmit and receive signals, and may utilize a plurality of antennas for space multiplexing transmission.

It should be noted that FIGS. 1 to 4 are not intended to limit the scope of the present disclosure. That is, the method or an operation of the configuration, which are illustrated in FIGS. 1 to 4, should not be construed as indispensable elements of an embodiment of the present disclosure, and the present disclosure can be implemented using a part of the same without departing from the scope of the present disclosure.

The above described operations may be implemented by providing a memory device storing corresponding program code to the entity of the communication system, the function, the base station, the load manager, or a specific structural element of the terminal. That is, the entity, the function, the load manager, or the controller of the terminal carries out the above described operations by reading and executing program code stored in the memory device by means of a processor or a central processing unit (CPU).

The entity, the function, the base station, the load manager, various structural elements of the terminal, modules and the like may be operated by using a hardware circuit, e.g., a complementary metal oxide semiconductor (CMOS) based logic circuit, firmware, software, and/or a combination of hardware, firmware, and/or software embedded in a machine readable medium.

For example, various electronic configurations and methods may be carried out by using electrical circuits such as transistors, logic gates, and an application specific integrated circuit (ASIC).

While the present disclosure has been shown and described with reference to certain embodiments thereof, it will be understood by those skilled in the art that various changes in form and details may be made therein without departing from the scope and spirit of the present disclosure. Therefore, the present disclosure is not defined as being limited to the embodiments thereof, but is defined by the appended claims, and the equivalents thereof.

What is claimed is:

1. An interference cancellation method of user equipment (UE) in a cellular communication system, the method comprising:

receiving signals including a desired signal and an interference signal from one or more base stations;

determining a maximum likelihood (ML) decision metric to determine a value "l" of a rank indicator (RI), a value "p" of a precoding matrix indicator (PMI), and a value "q" of a modulation (MOD) level of the interference signal;

applying a logarithm to the ML decision metric, and applying a maximum-log approximation to a serving data vector and an interference data vector, which are included in the ML decision metric;

determining the values of "l," "p," and "q" using the applied ML decision metric; and cancelling the interference signal from the received signals using the determined values of "l," "p," and "q".

2. The method of claim 1, wherein the applied ML decision metric further includes a residual term for compensating for degradation of performance due to the application of the maximum-log approximation.

3. The method of claim 2, wherein the residual term is expressed as a bias term that corresponds to a difference between a residual term of a reference group of "l," "p," and "q" and a residual term of a candidate group of "l," "p," and "q".

4. The method of claim 3, wherein a value of the bias term is stored in a look-up table (LUT).

5. The method of claim 4, wherein the LUT includes the value of the bias term with respect to an interference to noise ratio (INR).

6. The method of claim 4, wherein the LUT includes at least one of 4-quadrature amplitude modulation (4QAM), 16QAM, 64QAM, and 256QAM, as the value of "q".

7. The method of claim 1, wherein a transmission mode (TM) of the interference signal is one of TM 2 of l=2, TM 4 of l=2, or TM 6 of l=1.

8. The method of claim 3, wherein the ML decision metric M is expressed as follows:

$$M_{l,p,q} \approx \sum_{k=1}^{K}\left(-\frac{1}{\sigma_n^2}\left\|r_k - H_k^S \hat{x}_k^S - G_k^I P_k^{I,L,p} \hat{x}_k^I\right\|^2\right) - K\ln(|\chi_{l,q}^I|) + K\Delta(l, p, q, \sigma_n)$$

wherein "$r_k$" is a signal vector that is received in a resource element (RE) k, $\sigma_n^2$ is a distribution of a noise vector, $H_k^S$ is an effective channel matrix of serving data, "K" is a number of REs, $\hat{x}_k^s$ is a serving data vector, $\hat{x}_k^I$ is an interference data vector, $G_k^I$ is an interference channel matrix, $P_k^I$ is an interference precoding matrix, $X_{l,q}$ is a group of available interference symbol vectors in "l" and "q," and $\Delta(l, p, q, \sigma_n)$ is a bias term.

9. An apparatus for interference cancellation in a cellular communication system, the apparatus comprising:

a transceiver; and a controller configured to:

receive signals including a desired signal and an interference signal from one or more base stations;

determine a maximum likelihood (ML) decision metric to determine a value "l" of a rank indicator (RI), a value "p" of a precoding matrix indicator (PMI), and a value "q" of a modulation (MOD) level of the interference signal;

apply a logarithm to the ML decision metric, and apply the maximum-log approximation to a serving data vector and an interference data vector, which are included in the ML decision metric;

determine the values of "l," "p," and "q" using the applied ML decision metric; and cancel the interference signal from the received signals using the determined values of "l," "p," and "q".

10. The apparatus of claim 9, wherein the applied ML decision metric further includes a residual term for compensating for degradation of performance due to the application of the maximum-log approximation.

11. The apparatus of claim 10, wherein the residual term is expressed as a bias term that corresponds to a difference between a residual term of a reference group of "l," "p," and "q" and a residual term of a candidate group of "l," "p," and "q".

12. The apparatus of claim 11, further comprising:

a memory, wherein a value of the bias term is stored in the form of a look-up table (LUT) in the memory.

13. The apparatus of claim 12, wherein the LUT includes the value of the bias term with respect to an interference to noise ratio (INR).

14. The apparatus of claim 12, wherein the LUT includes at least one of 4-quadrature amplitude modulation (4QAM), 16QAM, 64QAM, and 256QAM, as the value of "q".

15. The apparatus of claim 9, wherein a transmission mode (TM) of the interference signal is one of TM 2 of l=2, TM 4 of l=2, or TM 6 of l=1.

16. The apparatus of claim 11, wherein the ML decision metric M is expressed as follows:

$$M_{l,p,q} \approx \sum_{k=1}^{K}\left(-\frac{1}{\sigma_n^2}\left\|r_k - H_k^S \hat{x}_k^S - G_k^I P_k^{I,L,p} \hat{x}_k^I\right\|^2\right) - K\ln(|\chi_{l,q}^I|) + K\Delta(l, p, q, \sigma_n)$$

wherein "$r_k$" is a signal vector that is received in a resource element (RE) k, $\sigma_n^2$ is a distribution of a noise vector, $H_k^S$ is an effective channel matrix of serving data, "K" is a number of REs, $\hat{x}_k^s$ is a serving data vector, $\hat{x}_k^I$ is an interference data vector, $G_k^I$ is an interference channel matrix, $P_k^I$ is an interference precoding matrix, $\chi_{l,q}^i$ is a group of available interference symbol vectors in "l" and "q," and $\Delta(l, p, q, \sigma_n)$ is a bias term.

17. The apparatus of claim 9, wherein the determined values of "l," "p," and "q" are values to maximize the ML decision metric.

18. The apparatus of claim 16, wherein $\hat{x}_k^S$ and $\hat{x}_k^I$ are $x_k^s$ and $x_k^I$, respectively, which minimize a Euclidean distance expressed as the following equation, $$\|r_k - H_k^S x_k^S - G_k^I P_k^{I,l,p} x_k^I\|^2.$$

19. The apparatus of claim 9, further comprising:

a plurality of antennas configured to transmit and receive signals in a multiple-input-multiple-output (MIMO) link.

20. A chipset for interference cancellation in a cellular communication system, the chipset comprising:

a non-transitory computer-readable medium; and one or more processors, which when executing program instructions stored in the non-transitory computer-readable medium, controls the chipset to:

receive signals including a desired signal and an interference signal from one or more base stations;

determine a maximum likelihood (ML) decision metric to determine a value "l" of a rank indicator (RI), a value "p" of a precoding matrix indicator (PMI), and a value "q" of a modulation (MOD) level of the interference signal;

apply a logarithm to the ML decision metric, and apply a maximum-log approximation to a serving data vector and an interference data vector, which are included in the ML decision metric;
determine the values of "l," "p," and "q" using the applied ML decision metric; and
cancel the interference signal from the received signals using the determined values of "l," "p," and "q".

* * * * *